United States Patent
Koka et al.

(10) Patent No.: US 8,406,623 B2
(45) Date of Patent: *Mar. 26, 2013

(54) DATA CHANNEL ORGANIZATION FOR A SWITCHED ARBITRATED ON-CHIP OPTICAL NETWORK

(75) Inventors: Pranay Koka, Austin, TX (US); Michael Oliver McCracken, Austin, TX (US); Herbert Dewitt Schwetman, Jr., Austin, TX (US); Xuezhe Zheng, San Diego, CA (US); Ashok Krishnamoorthy, San Diego, CA (US)

(73) Assignee: Oracle International Corporation, Redwood City, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 12/707,554

(22) Filed: Feb. 17, 2010

(65) Prior Publication Data

US 2011/0200335 A1  Aug. 18, 2011

(51) Int. Cl.
  *H04J 14/00* (2006.01)
(52) U.S. Cl. .................. 398/45; 398/46; 398/50; 398/51
(58) Field of Classification Search .................... 398/12, 398/19, 45, 46, 48–54, 56, 57, 98
  See application file for complete search history.

(56) References Cited

U.S. PATENT DOCUMENTS

| | | | |
|---|---|---|---|
| 4,580,872 A | 4/1986 | Bhatt et al. | |
| 4,809,264 A | 2/1989 | Abraham et al. | |
| 5,541,914 A | 7/1996 | Krishnamoorthy et al. | |
| 5,602,663 A | 2/1997 | Hamaguchi et al. | |
| 5,742,585 A | 4/1998 | Yamamoto et al. | |
| 5,943,150 A * | 8/1999 | Deri et al. ........................ | 398/89 |
| 6,021,263 A | 2/2000 | Kujoory et al. | |
| 6,289,021 B1 * | 9/2001 | Hesse ............................ | 370/409 |
| 6,633,542 B1 | 10/2003 | Natanson et al. | |
| 6,665,495 B1 | 12/2003 | Miles et al. | |
| 6,873,796 B1 | 3/2005 | Nakahira | |
| 7,403,473 B1 * | 7/2008 | Mehrvar et al. ............... | 370/217 |
| 7,804,504 B1 * | 9/2010 | Agarwal ....................... | 345/505 |
| 2003/0214962 A1 * | 11/2003 | Allaye-Chan et al. ......... | 370/406 |
| 2004/0037558 A1 | 2/2004 | Beshai | |
| 2009/0046572 A1 | 2/2009 | Leung | |
| 2011/0103799 A1 * | 5/2011 | Shacham et al. ............... | 398/115 |

OTHER PUBLICATIONS

Vantrease, D., et al., "Corona:System Implications for Emerging Nanophotonic Technology", International Symposium on Computer Architecture, IEEE, Jun. 2008, 12 pages.

(Continued)

*Primary Examiner* — Dalzid Singh
(74) *Attorney, Agent, or Firm* — Osha Liang LLP (57) ABSTRACT

A system for optical data communication, including: a first sending node including a first data item for transmission to a first receiving node during a first timeslot; a second sending node including a second data item for transmission during a second timeslot; a first optical data link (ODL) and a second ODL; a first output switch configured to switch the first data item from the first sending node onto the first ODL during the first timeslot; a second output switch configured to switch the second data item from the second sending node onto the first ODL during the second timeslot; an optical coupler connecting the first and second ODL; and a first input switch operatively connecting the first receiving node with the second ODL and configured to switch the first data item from the second ODL to the first receiving node during the first timeslot.

19 Claims, 6 Drawing Sheets

OTHER PUBLICATIONS

Wang, H., et al., "Nanophotonic Optical Interconnection Network Architecture for On-Chip and Off-Chip Communications", OFC/NFOEC, Feb. 2008, IEEE, 3 pages.

Krishnamoorthy, A. V., Ho, R., Zheng, X., Schwetman, H., Lexau, J., Koka, P., Li, G., Shubin I., Cunningham, J. E., "Computer Systems Based on Silicon Photonic Interconnects", Proceedings of the IEEE, vol. 97, No. 7, Jul. 2009, 25 pages.

Chae, C. Wong, E., and Tucker, R. S., "Optical CSMA/CD Media Access Scheme for Ethernet Over Passive Optical Network", IEEE Photonic Technology Letters, May 2002, 3 pages.

Desai, B. N., "An Optical Implementation of a Packet-Based (Ethernet) MAC in a WDM Passive Optival Network Overlay", Mar. 2001, 3 pages.

Qin, X., and Yang, Y., "Nonblocking WDM Switching Networks with Full and Limited Wavelength Conversion", IEEE Transactions on Communications, Dec. 2002, 10 pages.

Shacham, A., Bergman, K., and Carloni, L. P., "On the Design of a Photonic Network-on-Chip", First International Symposium on Networks-on-Chip, May 2007, 12 pages.

Yang, Y., and Wang, J., "Designing WDM Optical Interconnects with Full Connectivity by Using Limited Wavelength Conversion", IEEE Transactions on Computers, Dec. 2004, 10 pages.

Batten, C., et al., "Building Manycore Processor-to-DRAM Networks with Monolithic Silicon Photonics", Proceedings of the 16th Symposium on High Performance Interconnects (HOTI-16) Aug. 2008, 10 pages.

* cited by examiner

DATA CHANNEL ORGANIZATION FOR A SWITCHED ARBITRATED ON-CHIP OPTICAL NETWORK

STATEMENT REGARDING FEDERALLY SPONSORED RESEARCH OR DEVELOPMENT

This invention was made with Government Support under Agreement No. HR0011-08-9-0001 awarded by DARPA. The Government has certain rights in the invention.

CROSS-REFERENCE TO RELATED APPLICATIONS

This application is related to U.S. patent application Ser. No. 12/688,749, filed on Jan. 15, 2010, and entitled: "Time Division Multiplexing Based Arbitration For Shared Optical Links." Accordingly, U.S. patent application Ser. No. 12/688, 749 is incorporated herein by reference.

This application is related to U.S. patent application Ser. No. 12/610,124, filed on Oct. 30, 2009, and entitled: "Two-Phase Arbitration Mechanism for Shared Optical Links." Accordingly, U.S. patent application Ser. No. 12/610,124 is incorporated herein by reference.

BACKGROUND

As current designs close in on the physical limits of semiconductor based microprocessors, new problems, such as increased heat dissipation and power consumption, have prompted designers to consider alternatives to the traditional single die microprocessor. Accordingly, designers may employ parallel processing systems that include multiple microprocessors working in parallel in order to surpass the physical limits of a single processor system. However, such parallel systems with multiple processors place a different set of constraints on designers. For example, because each processor may be working on an independent task, more requests to memory, or other processors, may need to be issued. It may also be necessary to share information among the processors. Accordingly, the input/output ("I/O") bandwidth requirements for a system with multiple processors may be much higher than for a single processor system.

SUMMARY OF THE INVENTION

In general, in one aspect, the invention relates to a system for optical data communication. The system comprises: a first sending node comprising a first data item for transmission to a first receiving node during a first timeslot; a second sending node comprising a second data item for transmission during a second timeslot; a first optical data link (ODL) and a second ODL; a first output switch operatively connecting the first sending node and the first ODL and configured to switch the first data item onto the first ODL during the first timeslot, wherein the first output switch is deactivated for the second timeslot; a second output switch operatively connecting the second sending node and the first ODL and configured to switch the second data item onto the first ODL during the second timeslot, wherein the second output switch is deactivated for the first timeslot; an optical coupler operatively connecting the first ODL and the second ODL, wherein the optical coupler is configured to redirect the first data item and the second data item from the first ODL to the second ODL; and a first input switch operatively connecting the first receiving node with the second ODL and configured to switch the first data item from the second ODL to the first receiving node during the first timeslot.

In general, in one aspect, the invention relates to a system for optical data communication. The system comprises: a first sending node comprising a first data item for transmission to a first receiving node during a first timeslot; a first optical coupler operatively connected to the first sending node; a second sending node comprising a second data item for transmission; a second optical coupler operatively connected to the second sending node; a first series of input switches operatively connected to the first receiving node, wherein the first series of input switches comprises a first input switch and a second input switch; a first plurality of optical data links (ODLs) operatively connecting the first optical coupler and the first input switch, wherein the first plurality of ODLs are configured to propagate the first data item to the first input switch during the first timeslot; and a second plurality of ODLs operatively connecting the second optical coupler and the second input switch, wherein the second plurality of ODLs are configured to propagate the second data item, wherein the first input switch is configured to switch the first data item from the first plurality of ODLs to the receiving node during the first timeslot, and wherein the second input switch is deactivated for the first timeslot.

In general, in one aspect, the invention relates to a method for optical data communication. The method comprises: allocating a first timeslot to a first sending node in an arbitration domain and a second timeslot to a second sending node in the arbitration domain; placing a first data item from the first sending node onto a first optical data link (ODL) during the first timeslot; redirecting, using a first optical coupler, the first data item from the first ODL to a second ODL operatively connected to a plurality of input switches; switching, using a first input switch of the plurality of input switches, the first data item from the second ODL to a first receiving node during the first timeslot; and deactivating the first input switch for the second timeslot.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for data communication between multiple nodes in a node array (e.g., a grid). Between each transmitting (i.e., sending node) and receiving node there is a data path connecting the two nodes. In one or more embodiments of the invention, the data paths are implemented using optical links (i.e., optical data links). One or more segments of a data path may intersect with other data paths. The multiple data paths that intersect form an optical data channel. Accordingly, an optical data channel connects a group of nodes configured to send data items (i.e., sending nodes) with a set of receiving nodes using intersecting data paths. The set of receiving nodes may correspond to a single node or multiple nodes.

In general, as an optical data channel includes multiple data paths that intersect, arbitration is required to determine which of the sending nodes is entitled to send a data item at a given time (i.e., during a given timeslot). Accordingly, the sending nodes, the optical data channel, and the set of receiving nodes may be referred to as an arbitration domain. In other words, an arbitration domain includes a group of nodes that require arbitration to send data to at least one receiving node. Accordingly, arbitration domains having the same sending nodes but different receiving nodes are identified as different arbitration domains. An array of nodes may have any number of arbitration domains. Arbitration domains are further discussed below in reference to FIG. 1 and FIG. 2.

In one or more embodiments of the invention, each timeslot is allocated exclusively to one sending node within the arbitration domain. All timeslots may be of the same duration. Alternatively, the timeslots may be of different durations. In one or more embodiments, the series of timeslots is controlled by a common timeslot clock shared among nodes in the arbitration domain. During each timeslot, only the node exclusively allocated to the present timeslot is allowed to send data to a receiving node using the optical data channel. The allocation of such timeslots is based on arbitration amongst the sending nodes in the arbitration domain.

In general, more details regarding arbitration and arbitration domains may be found in U.S. patent application Ser. No. 12/688,749, filed on Jan. 15, 2010, and entitled: "Time Division Multiplexing Based Arbitration For Shared Optical Links"; and U.S. patent application Ser. No. 12/610,124, filed on Oct. 30, 2009, and entitled: "Two-Phase Arbitration Mechanism for Shared Optical Links." Both patent applications are incorporated herein by reference.

Figure 1:
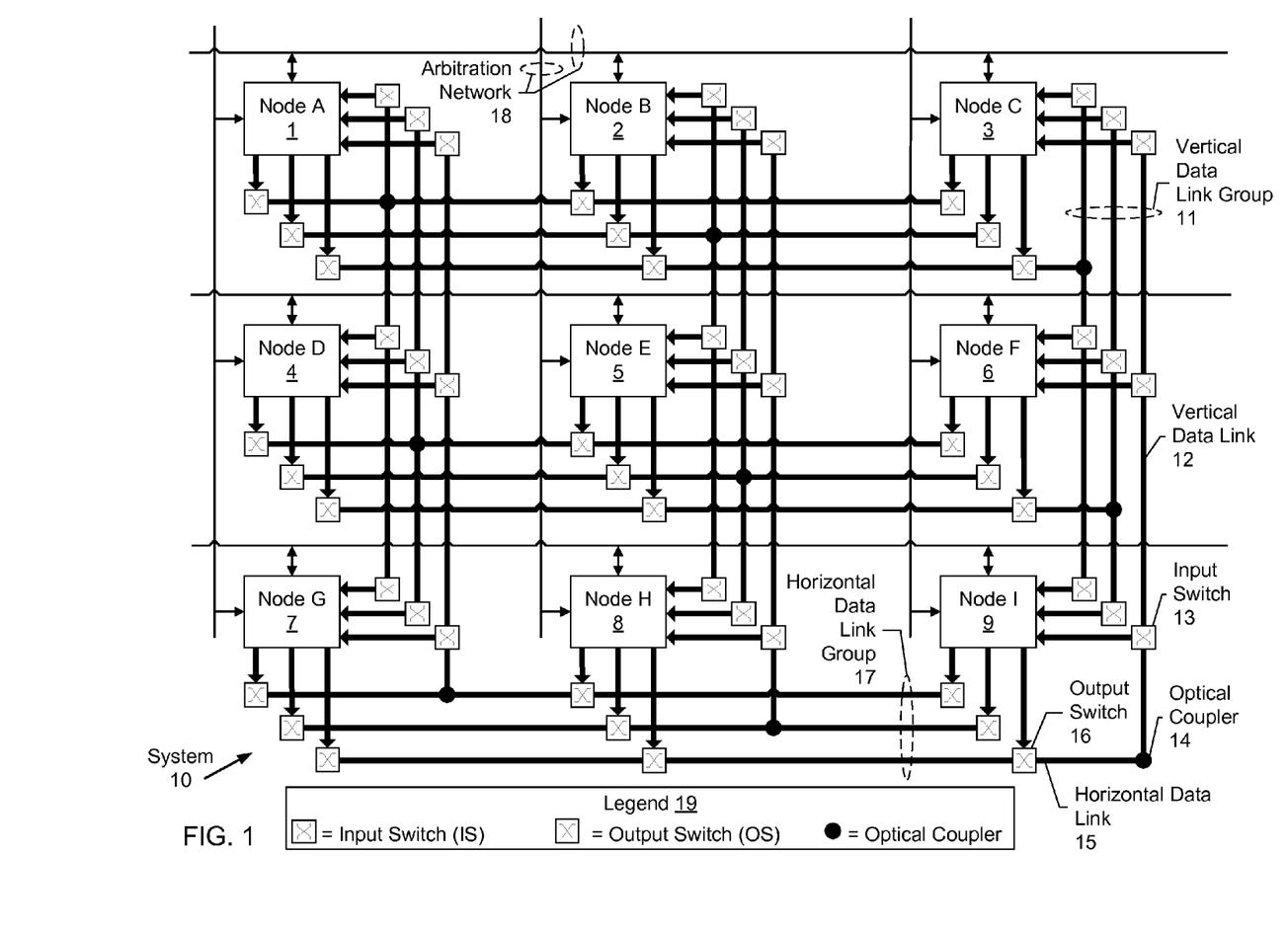
FIG. 1 shows a system in accordance with one or more embodiments of the invention.

FIG. 1 shows a system (10) in accordance with one or more embodiments of the invention. Those skilled in the art, having the benefit of this detailed description, will appreciate that the components shown in FIG. 1 may differ among embodiments of the invention, and that one or more of the components may be optional. In one or more embodiments of the invention, components shown in FIG. 1 may be omitted, repeated, supplemented, and/or otherwise modified from those shown in FIG. 1. Accordingly, the specific arrangement of components shown in FIG. 1 should not be construed as limiting the scope of the invention.

As shown in FIG. 1, the system (10) includes multiple nodes (e.g., Node A (1)-Node I (9)), an optical data network designated by thick black lines, and an optical arbitration network (18) designated by thin black lines.

In one or more embodiments of the invention, the system (10) corresponds to a macro-chip architecture based on optical data communication. The macro-chip architecture may include a silicon photonic optical network. Specifically, the optical data links (e.g., Vertical Data Link Group (11), Horizontal Data Link Group (17)) in the silicon photonic optical network are shared between nodes (e.g., Node A (1)-Node I (9)) disposed on the macro-chip by dynamically switching the optical data links between different sources (i.e., sending nodes) and destinations (i.e., receiving nodes) in the macro-chip. For example, the silicon photonic optical network may be a switched optical network that uses a 1×2 broadband optical switching elements. In one or more embodiments of the invention, the macro-chip is essentially the same as the macro-chip discussed in the document entitled: "Computer Systems Based on Silicon Photon Interconnects" by Krishnamoorthy, A. V. et al., and published in the Proceedings of the IEEE, Vol. 97, No. 7, July 2009, which is hereby incorporated by reference in its entirety.

In one or more embodiments of the invention, each of the nodes (e.g., Node A (1)-Node I (9)) in the system (10) may correspond to a die (e.g., semiconductor die). In one or more embodiments of the invention, each die includes one or more processors and/or one or more cache memories. Further, all nodes (e.g., Node A (1)-Node I (9)), may be disposed on a single chip (e.g., a macro-chip) as part of a larger mesh structure.

As discussed above, the nodes (e.g., Node A (1)-Node I (9)) are operatively coupled using an optical data network. The optical data network includes shared optical data link groups (i.e., Vertical Data Link Group (11), Horizontal Data Link Group (17)) for the transmission of data. An optical data link group is a collection of optical data links. For example, the vertical data link group (11) includes the vertical data link (12). The horizontal data link group (17) includes the horizontal data link (15).

In one or more embodiments of the invention, each data link (e.g., Vertical Data Link (12), Horizontal Data Link (15)) includes one or more waveguides. A waveguide is a medium for the transmission of optical signals carrying/representing data. The wavelength of each optical signal may be selected by the sender of the data (i.e., sending node). Data carried/represented by the optical signals travels from one node to another node along the waveguides. The path of the data from one node to another node forms a data path. When multiple data paths intersect (i.e., have at least a portion of a data link in common), the intersecting data paths form an optical data channel.

In one or more embodiments of the invention, the nodes (e.g., Node A (1)-Node I (9)) connect to the data network via input switches and output switches. Although not specifically shown, each of the nodes (e.g., Node A (1)-Node I (9)) include unidirectional input ports and output ports for the connections. For example, the node I (9) is coupled to the horizontal data link (15) via the output switch (16). The node I (9) is also coupled to the vertical data link (12) via the input switch (13). Thus, the node I (9) sends data via the output switch (16) and receives data via the input switch (13).

In one or more embodiments of the invention, the input switches (e.g., input switch (13)) are broadband switches. When an input switch is turned "on" (i.e., activated), it switches all the wavelengths in a waveguide to one of the two output waveguides. When the input switch is turned "off" (i.e., deactivated), all wavelengths are passed through to the other input waveguide. As discussed above, the optical signals carry/represent data transmitted by the sending node. The input switch (e.g., input switch (13)) includes functionality to transmit (i.e., switch) the data received on a vertical data link to the receiving node. Similarly, an output switch (e.g., output switch (16)) is configured to transmit (i.e., switch) data generated/provided by the sending node to a horizontal data link.

An optical coupler (e.g., optical coupler (14)) is configured to redirect optical signals propagating on one data waveguide to another data waveguide. As shown in FIG. 1, the horizontal data links and the vertical data links are connected by optical couplers. For example, the vertical data link (12) is connected to the horizontal data link (15) using the optical coupler (14). Moreover, a horizontal waveguide, a vertical waveguide, and an optical coupler connecting said horizontal waveguide and said vertical waveguide correspond to an optical data channel. As shown in the legend (19), optical couplers are designated in FIG. 1 by a solid black circle.

Although not specifically shown in FIG. 1, a row of nodes may be referred to as a node row. For example, node A (1), node B (2), and node C (3) form node row 0. Likewise, node D (4), node E (5), and node F (6) form node row 1. Also, node G (7), node H (8) and node I (9) form node row 2. A column of nodes may be referred to as a node column. For example, node A (1), node D (4), and node G (7) form node column 0. Likewise, node B (2), node E (5), node H (8) form node column 1. Also, node C (3), node F (6), and node I (9) form node column 2. In this context, the horizontal data link group (17) and the horizontal data link (15) are referred to as being associated with the node row 2 while the vertical data link group (11) and the vertical data link (12) are referred to as being associated with the node column 2.

In one or more embodiments of the invention, the architecture of the system (10) shown in FIG. 1 creates multiple arbitration domains. Specifically, each node row/node column pair corresponds to an arbitration domain. Within an arbitration domain, the nodes of the node row are sending nodes, while the nodes of the node column are receiving nodes. In view of the above, the nodes of a node row must arbitrate for timeslots to communicate with the nodes in the node column. The sending node wining the arbitration for a timeslot turns on (i.e., activates) the output switch feeding a horizontal optical data link in the data channel, while the receiving node turns on (i.e., activates) the input switch along a vertical optical data link in the data channel. When the timeslot is complete or when only a predetermined amount of time remains in the timeslot, the mentioned output switch and input switch are turned off (i.e., deactivated).

In view of FIG. 1, arbitration is only required when two sending nodes within the same node row have data for transmission to either (i) the same receiving node; or (ii) two receiving nodes located within the same node column. In other words, arbitration is not required when two sending nodes within the same node row have data for transmission to two receiving nodes located within different node columns. Further, arbitration is not required between two sending nodes located in different node rows.

Although FIG. 1 shows a system having three node rows and three node columns, more or fewer node rows and/or node columns may be used without departing from the scope of the invention. In one or more embodiments of the invention, the number of node rows is equal to the number of node columns. In one or more embodiments of the invention, increases in the number of node rows and node columns may be achieved by adding additional data links, input switches, and output switches.

For example, the discussion above applies generally to an N×M array having N node rows and M node columns. Said in other words, the system (10) may have any number of nodes (e.g., 4 nodes, 64 nodes, 10000 nodes, etc.). In an N×M array, there are M horizontal optical data links associated with each node row. Each of the M horizontal optical data links is communicatively coupled to each node in the node rode via at least one output switch. Further, in an N×M array, there are N vertical optical data links associated with each node column. Each of the N vertical optical links is communicatively coupled to each node in the node column via at least one input switch. Accordingly, an N×M array includes N*M optical couplers each coupling one of N*M horizontal optical data links with one of N*M vertical optical data links.

Figure 2:
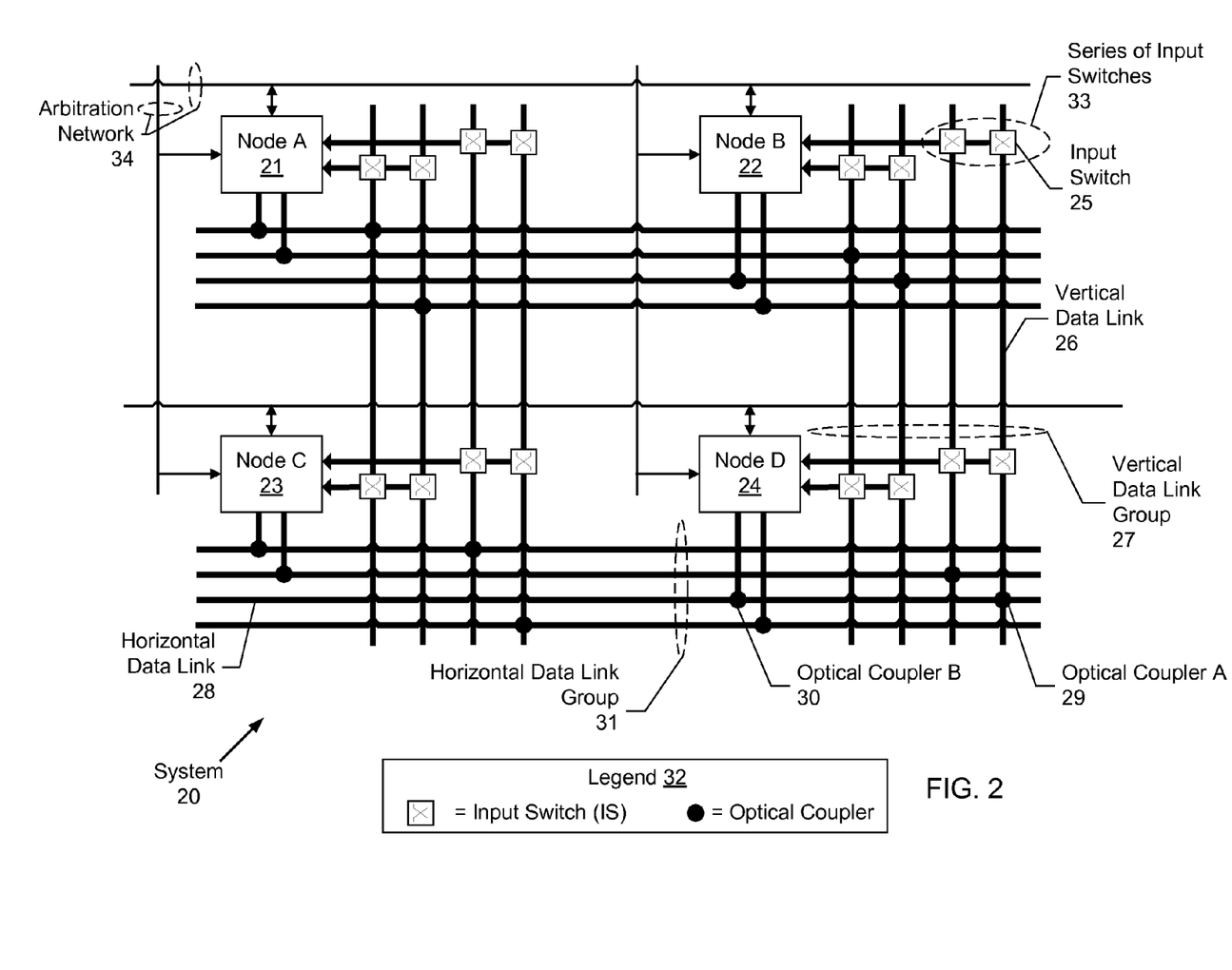
FIG. 2 shows a system in accordance with one or more embodiments of the invention.

FIG. 2 shows a system (20) in accordance with one or more embodiments of the invention. Those skilled in the art, having the benefit of this detailed description, will appreciate the components shown in FIG. 2 may differ among embodiments of the invention, and that one or more of the components may be optional. In one or more embodiments of the invention, components shown in FIG. 2 may be omitted, repeated, supplemented, and/or otherwise modified from those shown in FIG. 2. Accordingly, the specific arrangement of components shown in FIG. 2 should not be construed as limiting the scope of the invention.

As shown in FIG. 2, the system (20) includes an optical data network designated by the thick black lines. The system (20) includes an array of nodes (e.g., Node A (21), Node B (22), Node C (23), Node D (24)) operatively coupled using shared optical data links. The nodes (e.g., Node A (21)-Node D (24)), node rows, node columns, optical data link groups (e.g., Horizontal Data Link Group (31), Vertical Data Link Group (27)), optical data links (e.g., Horizontal Data Link (28), Vertical Data Link (26)), and optical couplers (e.g., Optical Coupler A (29)) are similar to the nodes, node rows, node columns, optical data link groups, optical data links, and optical couplers, respectively, as discussed above in reference to FIG. 1. Moreover, the nodes (e.g., Node A (21)-Node D (24)) in FIG. 2 are configured to communicate with the data network shown in FIG. 2, which is arbitrated using the arbitration network (34).

In one or more embodiments of the invention, each node is coupled to a horizontal optical data link (e.g., Horizontal Data Link (28)) via an optical coupler (e.g., Optical Coupler B (30)). As discussed above, an optical coupler is configured to redirect optical signals propagating on one data waveguide to another data waveguide. In the case of the system (20), the optical couplers redirect optical signals generated/provided by the nodes onto the horizontal optical data links. For example, the node D (24) is connected to the horizontal data link (28) by the optical coupler B (30). In this example, the optical coupler B (30) allows the node D (24) to transmit data on the horizontal data link (28) by redirecting the optical signal(s) from the node D (24) to the horizontal data link (28). As shown in the legend (32), optical couplers are represented in FIG. 2 as solid black circles.

Still referring to FIG. 2, each node is coupled to a vertical optical data link via an input switch. For example, the node B (22) is coupled to the vertical data link (26) via the input switch (25). Moreover, each input port (not shown) of a node is connected to a series of input switches. For example, the input port of the node B (22) is connected to the series of input switches (33). In one or more embodiments of the invention, the number of switches in the series is dependent on the number of nodes in a node row. In one or more embodiments of the invention, only one input switch of a series can be activated for a timeslot. The remaining input switches of the series are deactivated for the timeslot. When the timeslot is complete, or when there is only a pre-determined amount of time left in the timeslot, the receiving node deactivates the input switch of the series of input switches.

Additional node columns may be added to the data network without departing from the scope of the invention. For example, additional node columns may be added to the system shown in FIG. 2 by adding additional horizontal and vertical waveguides and adding another switch in each of the series of switches. Further, additional node rows may be added by adding an additional series of switches, connecting another input port of the node to the additional series of switches, and adding corresponding horizontal and vertical waveguides.

In one or more embodiments of the invention, the data paths connecting a single receiving node with the sending nodes in a node row intersect. Specifically, as shown in FIG. 2, all nodes in a node row connect to the same input port on the receiving node. For example, the node C (23) and the node D (24) in node row 1 communicate with the node B (22) by sharing the series of input switches (33) at node B (22). Therefore, the data paths from the nodes in a node row intersect. As the data paths intersect, the data paths form an optical data channel from the nodes in the node row to the particular receiving node. Therefore, all sending nodes in a node row are in an arbitration domain for the data channel to the receiving node. In other words, there exists one arbitration domain for each node row/receiving node pair. As the system (20) is a two by two array of nodes, there exists four arbitration domains for each node row in FIG. 2. Therefore, there exists a total of 8 arbitration domains in the system (20).

In view of FIG. 2, arbitration is only required when two sending nodes within the same node row have data for transmission to the same receiving node. In other words, arbitration is not required when two sending nodes within the same node row have data for transmission to two receiving nodes, even when the two receiving node are in the same node column. Further, arbitration is not required between two sending nodes in different node rows.

Although FIG. 2 shows a system having two node rows and two node columns, more or fewer node rows and/or node columns may be used without departing from the scope of the invention. In one or more embodiments of the invention, the number of node rows is equal to the number of node columns. In one or more embodiments of the invention, increases in the number of node rows and node columns may be achieved by adding additional data links and input switches.

For example, the discussion above applies generally to an N*M node array having N node rows and M node columns. Each sending node can transmit on M horizontal optical data links. Thus, the N*M node array includes N*M*M horizontal optical data links, each connected to one of N*M*M vertical optical data links.

Figure 3:
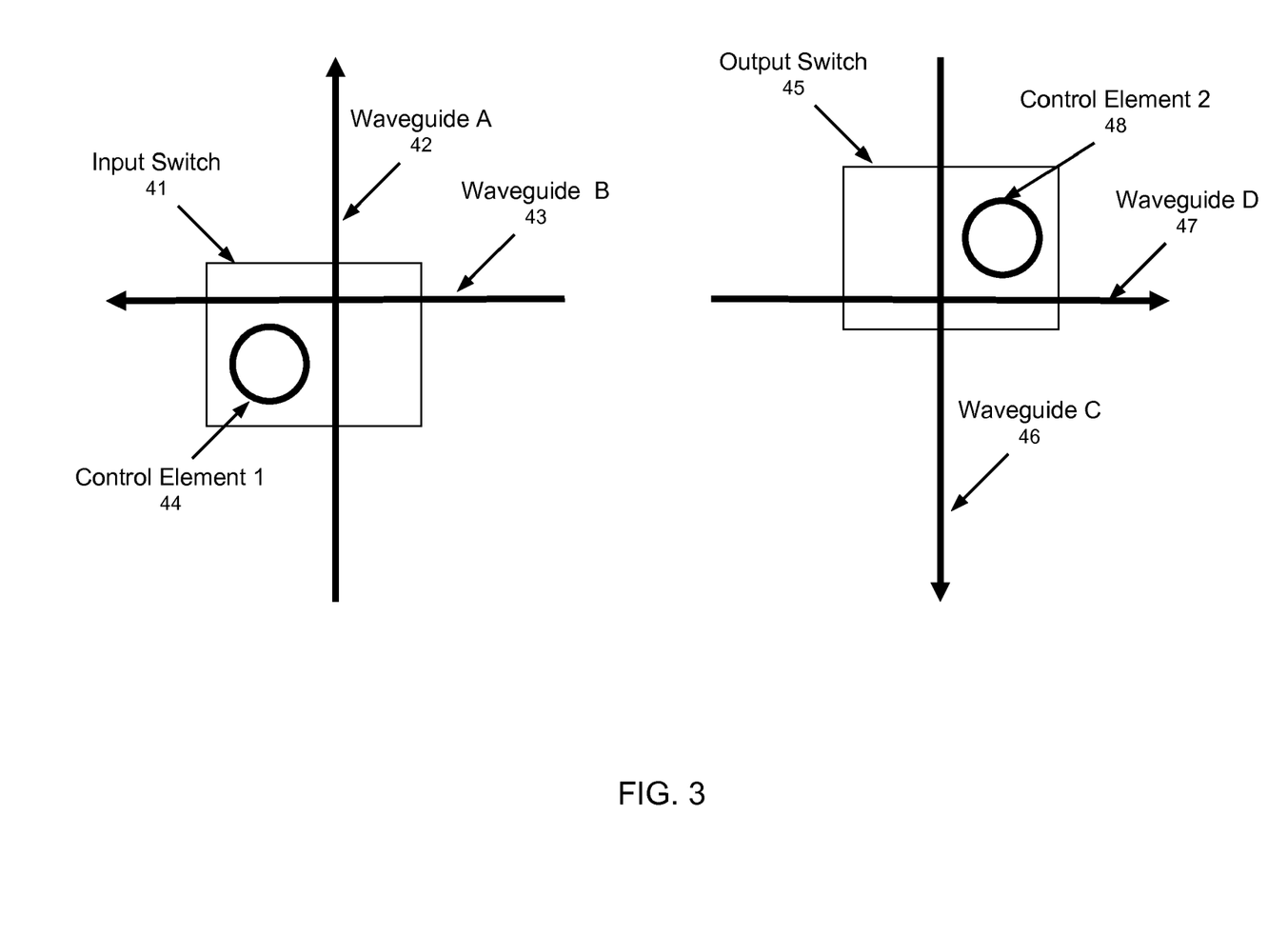
FIG. 3 shows multiple optical switches in accordance with one or more embodiments of the invention.

FIG. 3 shows multiple optical switches (i.e., Input Switch (41), Output Switch (45)) in accordance with one or more embodiments of the invention. The input switch (41) may be essentially the same as the input switches discussed above in reference to FIG. 1 and FIG. 2. Similarly, the output switch (45) may be essentially the same as the output switches discussed above in reference to FIG. 1 and FIG. 2.

As shown in FIG. 3, the input switch (41) includes a control element 1 (44) disposed adjacent to a junction of waveguides (i.e., Waveguide A (42) and Waveguide B (43)). In a default state, when no control signal (e.g., voltage signal) is applied to the control element 1 (44) (i.e., the input switch (41) is deactivated), optical signals travel along the waveguide A (42), in the direction denoted in FIG. 3, without interruption. However, when a control signal is applied to the control element 1 (44) (i.e., the input switch (41) is activated), optical signals traveling along the waveguide A (42) are switched (i.e., diverted) to the waveguide B (43). The control signal may be applied by a receiving node operatively connected to the input switch (41) and specifically the waveguide B (43). Further, the control signal may be applied for a timeslot in order to activate the input switch (41) for the timeslot. Finally, the waveguide A (42) may correspond to a vertical optical data link, discussed above in reference to FIG. 1 and FIG. 2.

As shown in FIG. 3, the output switch (45) includes a control element 2 (48) disposed adjacent to a junction of waveguides (i.e., Waveguide C (46) and Waveguide D (47)). In a default state, when no control signal (e.g., voltage signal) is applied to the control element 2 (48) (i.e., the output switch is deactivated), optical signals travel along the waveguide C (46), in the direction denoted in FIG. 3, without interruption. However, when a control signal is applied to the control element 2 (48) (i.e., the input output switch is activated), optical signals traveling along the waveguide C (46) are switched (i.e., diverted) to the waveguide D (47). The control signal may be applied by a sending node operatively connected to the output switch (45) and specifically the waveguide C (46). Further, the control signal may be applied for a timeslot in order to activate the output switch (45) for the timeslot. Finally, the waveguide D (47) may correspond to a horizontal optical data link, discussed above in reference to FIG. 1 and FIG. 2.

Figure 4A:
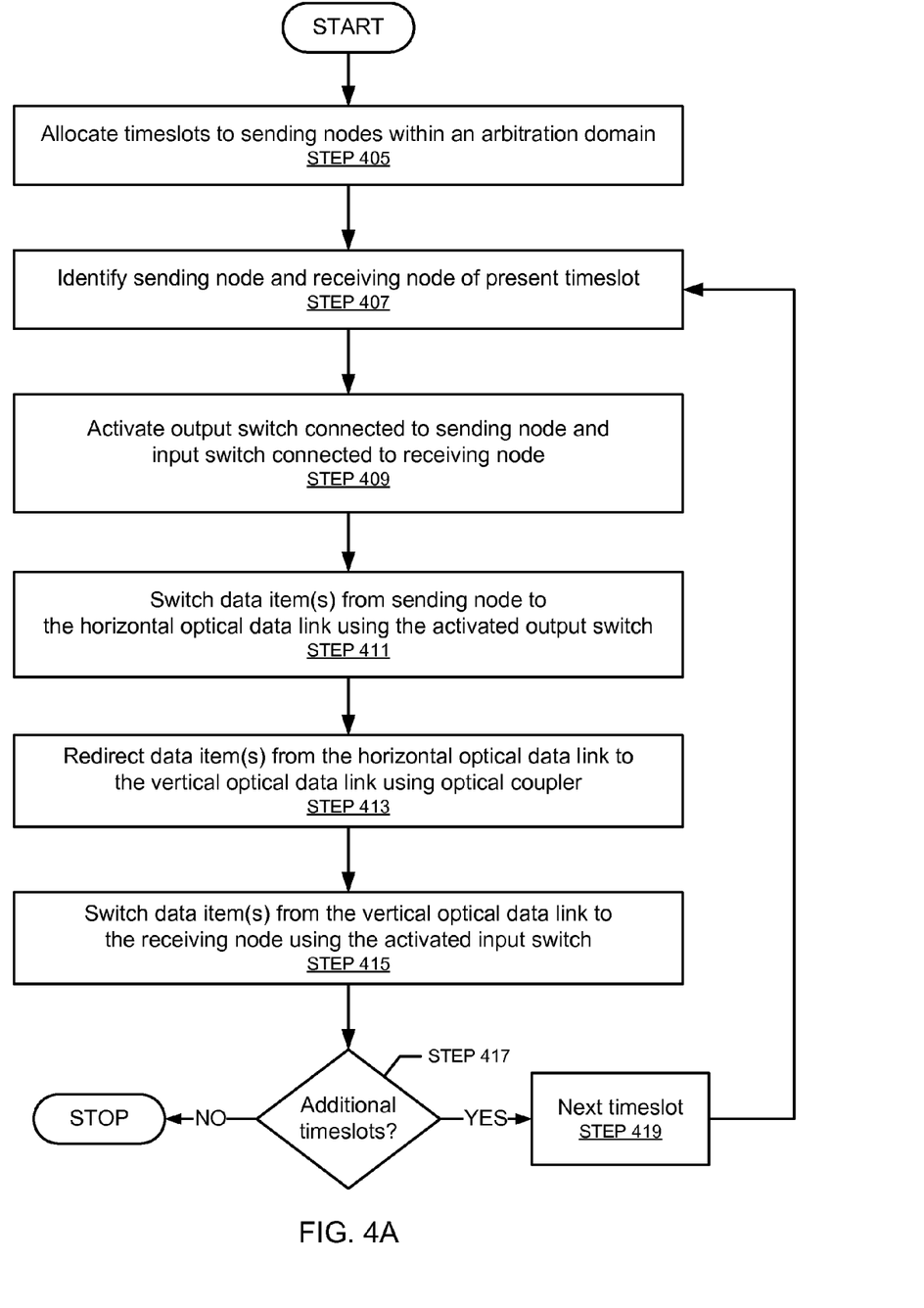
FIGS. 4A and 4B show flowcharts in accordance with one or more embodiments of the invention.

FIG. 4A shows a flowchart in accordance with one or more embodiments of the invention. The process depicted in FIG. 4A may be implemented using system (10) described in reference to FIG. 1 above. Specifically, the process depicted in FIG. 4A may pertain to a single arbitration domain (i.e., a node row/node column pair) within the system (10). The steps shown in FIG. 4A may be omitted, repeated, and/or performed in a different order. Accordingly, embodiments of the invention should not be considered limited to the specific arrangements of steps shown in FIG. 4A.

Initially, upcoming timeslots are allocated to the sending nodes of the arbitration domain (STEP 405). As discussed above, the allocation of timeslots is the result of arbitration among the sending nodes. As also discussed above, more details regarding arbitration and the allocation of timeslots may be found in U.S. patent application Ser. No. 12/688,749, filed on Jan. 15, 2010, and entitled: "Time Division Multiplexing Based Arbitration For Shared Optical Links"; and U.S. patent application Ser. No. 12/610,124, filed on Oct. 30, 2009, and entitled: "Two-Phase Arbitration Mechanism for Shared Optical Links." Both patent applications are incorporated herein by reference.

In STEP 407, the sending node and the receiving node assigned to the present timeslot are identified. The sending node may have one or more data items for transmission to the receiving node. The sending node may be located in a node row of a node array, while the receiving node may be located in a node column of the node array. Moreover, as shown in FIG. 1, the sending node and the receiving node may be connected by an optical data channel having a horizontal optical data link and a vertical optical data link connected by an optical coupler. As also shown in FIG. 1, the sending node is operatively connected to the optical data channel (i.e., the horizontal optical data link) by an output switch, while the receiving node is operatively connected to the optical data channel (i.e., the vertical optical data link) by an input switch.

In STEP 409, the output switch operatively connecting the sending node and the horizontal optical data link of the optical data channel is activated for the present timeslot. The output switch may be controlled (i.e., activated/deactivated) by the sending node. Further, the input switch operatively connecting the receiving node and the vertical optical data link of the optical data channel is activated for the present timeslot. The input switch may be controlled (i.e., activated/deactivated) by the receiving node. In one or more embodiments of the invention, the input switches and the output switches that are connected to the optical data channel but not to the sending node or the receiving node are deactivated for the timeslot.

In STEP 411, one or more optical signals carrying/representing data items for transmission are generated/provided by the sending node and switched to the horizontal optical data link by the activated output switch. As discussed above in reference to FIG. 3, the switching (i.e., diverting) of the optical signals is the result of activating the output switch (i.e., applying a control signal to the output switch).

In STEP 413, the one or more optical signals carrying/representing data items for transmission are redirected from the horizontal optical data link to the vertical optical data link of the optical data channel using the optical coupler.

In STEP 415, the one or more optical signals carrying/representing data items for transmission are switched from the vertical optical data link to the receiving node using the activated input switch. As discussed above in reference to FIG. 3, the switching (i.e., diverting) of the optical signals is the result of activating the input switch (i.e., applying a control signal to the input switch).

In STEP 417, it is determined whether additional timeslots exist. When it is determined that additional timeslots exist, the process advances to the next timeslot (STEP 419), and returns to STEP 407. When it is determined no additional timeslots exist, the process ends. In one or more embodiments of the invention, the process may proceed to STEP 419 immediately after executing STEP 415 (i.e., STEP 417 is omitted).

Figure 4B:
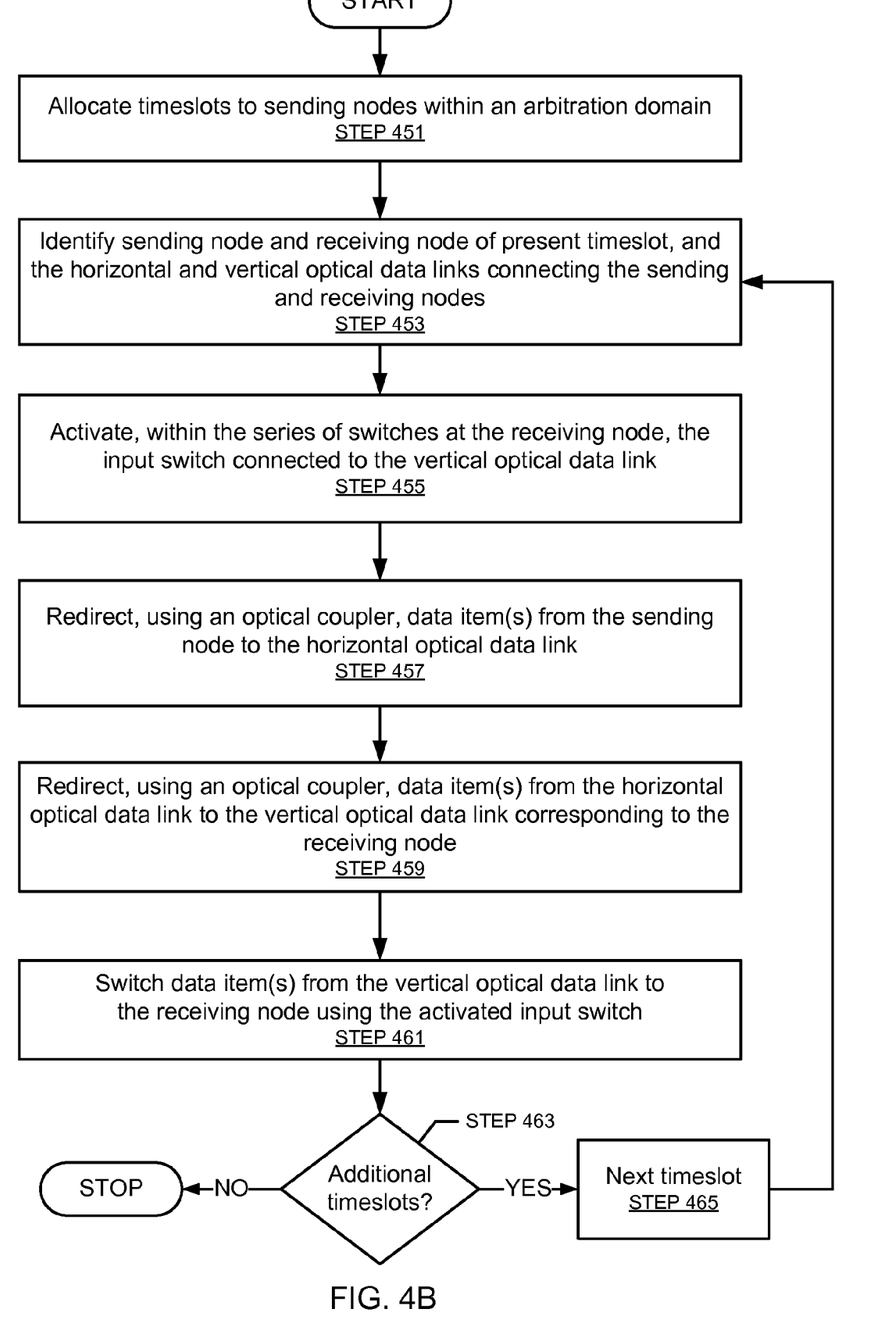

FIG. 4B shows a flowchart in accordance with one or more embodiments of the invention. The process depicted in FIG. 4B may be implemented using system (20) described in reference to FIG. 2 above. Specifically, the process depicted in FIG. 4B may pertain to a single arbitration domain (i.e., a node row/receiving node pair) within the system (20). The steps shown in FIG. 4B may be omitted, repeated, and/or performed in a different order. Accordingly, embodiments of the invention should not be considered limited to the specific arrangements of steps shown in FIG. 4B.

Initially, upcoming timeslots are allocated to the sending nodes of the arbitration domain (STEP 451). As discussed above, the allocation of timeslots is the result of arbitration among the sending nodes. As also discussed above, more details regarding arbitration and the allocation of timeslots may be found in U.S. patent application Ser. No. 12/688,749, filed on Jan. 15, 2010, and entitled: "Time Division Multiplexing Based Arbitration For Shared Optical Links"; and U.S. patent application Ser. No. 12/610,124, filed on Oct. 30, 2009, and entitled: "Two-Phase Arbitration Mechanism for Shared Optical Links." Both patent applications are incorporated herein by reference.

In STEP 453, the sending node and the receiving node assigned to the present timeslot are identified. The sending node may have one or more data items for transmission to the receiving node. The sending node may be located in a node row of a node array, while the receiving node may be located in a node column of the node array. Moreover, as shown in FIG. 2, the sending node and the receiving node may be connected by an optical data channel having a horizontal optical data link and a vertical optical data link connected by an optical coupler. As also shown in FIG. 2, the sending node is operatively connected to the horizontal optical data link by an optical coupler, while the receiving node is operatively connected to the vertical optical data link by an input switch within a series of input switches.

In STEP 455, the input switch within the series of input switches that is operatively connected to the vertical optical data link is activated for the present timeslot. The input switch may be controlled (i.e., activated/deactivated) by the receiving node. In one or more embodiments of the invention, the input switches within the series of input switches that are not connected to the vertical optical data link are deactivated for the timeslot.

In STEP 457, one or more optical signals carrying/representing data items for transmission are generated/provided by the sending node and redirected onto the horizontal optical data link by an optical coupler.

In STEP 459, the one or more optical signals carrying/representing data items for transmission are redirected from the horizontal optical data link to the vertical optical data link of the optical data channel using an optical coupler. However, as shown in FIG. 2, the optical coupler of STEP 459 is not the same as the optical coupler of STEP 457.

In STEP 461, the one or more optical signals carrying/representing data items for transmission are switched from the vertical optical data link to the receiving node using the activated input switch within the series of input switches. As discussed above in reference to FIG. 3, the switching (i.e., diverting) of the optical signals is the result of activating the input switch (i.e., applying a control signal to the input switch).

In STEP 463, it is determined whether additional timeslots exist. When it is determined that additional timeslots exist, the process advances to the next timeslot (STEP 465), and returns to STEP 453. When it is determined no additional timeslots exist, the process ends. In one or more embodiments of the invention, the process may proceed to STEP 465 immediately after executing STEP 461 (i.e., STEP 463 is omitted).

In view of FIG. 2, during a given timeslot, multiple sending nodes within the same node row may transmit data items to different receiving nodes, even if the different receiving nodes are located within the same node column. In other words, during the execution of the steps in FIG. 4B, a different sending node than the sending node mentioned in STEP 453 but located in the same node row may transmit data items to a different receiving node than the receiving node mention in STEP 453, even if the two receiving nodes are in the same node column.

Figure 5:
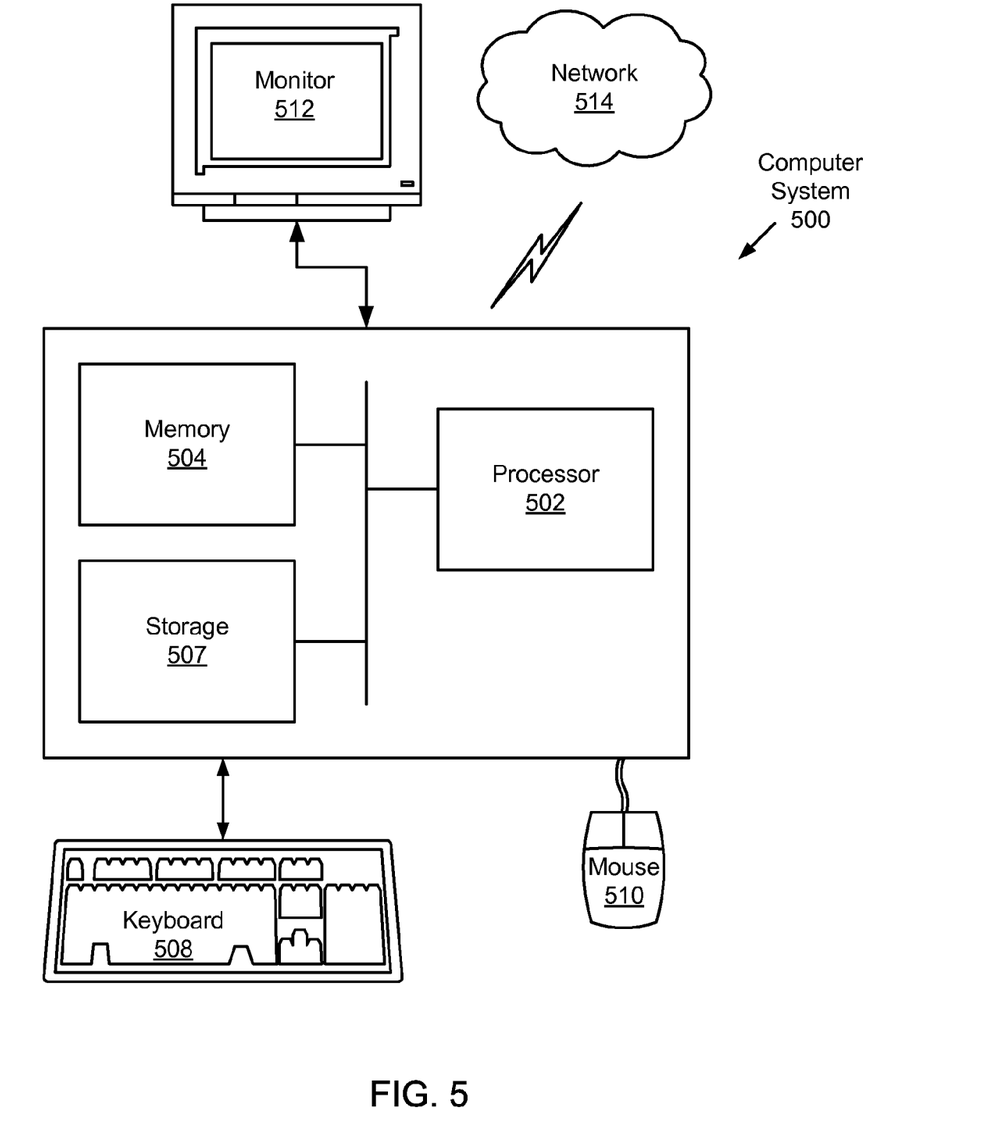
FIG. 5 shows a computer system in accordance with one or more embodiments of the invention.

FIG. 5 shows a computer system (500) in accordance with one or more embodiments of the invention. One or more portions of the invention may be a component in the computer system (500) (e.g., an integrated circuit in the computer system (500)). As shown in FIG. 5, the computer system (500) includes a processor (502), associated memory (504), a storage device (507), and numerous other elements and functionalities typical of today's computers (not shown). One or more portions of the invention may include a component in the computer system (500) (e.g., the processor (502), the memory (504), etc.). The computer system (500) may also include input means, such as a keyboard (508) and a mouse (510), and output means, such as a monitor (512). The computer system (500) is connected to a local area network (LAN) or a wide area network (e.g., the Internet) (514) via a network interface connection (not shown). Those skilled in the art will appreciate that these input and output means may take other forms, now known or later developed. Further, those skilled in the art will appreciate that one or more elements of the aforementioned computer system (500) may be located at a remote location and connected to the other elements over a network.

One or more embodiments of the invention exhibit one or more of the following advantages. The system and method disclosed herein may increase the point-to-point bandwidth between any two nodes in the node array of a macro-chip (e.g., used in large scale symmetric multi-processing (SMP) systems) over that of a static WDM point to point scheme under the same power and area constraints. Further, the system and method disclosed herein may increase parallelism in data transfers based on multiple shared domains without enlarging the network topology.

The properties of optical waveguides such as low latency, high bit-rate, and wavelength division multiplexing (WDM) (i.e., sending multiple wavelengths through a single waveguide) may be utilized in a silicon photonic optical network to exceed the performance of an electronic data network having metal or alloy traces. The design of a photonic optical network must consider:

(1) Number of waveguides, which determines the substrate area consumed by the optical data interconnects.

(2) Number of lasers, modulators and receivers (e.g., photo-detectors), which determines the required optical power and complexity.

(3) Number of outputs from a waveguide, which determines the amount of source power at a given bit-rate.

(4) Number of input sources to a certain wavelength in a waveguide, which may dictate the use of optical switches, which increases complexity and contributes towards power loss.

(5) Number of optical to electrical conversions, which is desirable to be minimized.

(6) Sharing interconnect links to provide high bandwidth between two points in a network with the trade-off of contention induced bandwidth limitation.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A system for optical data communication, comprising:
a first sending node comprising a first data item for transmission to a first receiving node during a first timeslot;
a second sending node comprising a second data item for transmission during a second timeslot;
a first optical data link (ODL) and a second ODL;
a first output switch operatively connecting the first sending node and the first ODL and configured to switch the first data item onto the first ODL during the first timeslot, wherein the first output switch is deactivated for the second timeslot;
a second output switch operatively connecting the second sending node and the first ODL and configured to switch the second data item onto the first ODL during the second timeslot, wherein the second output switch is deactivated for the first timeslot;
an optical coupler operatively connecting the first ODL and the second ODL, wherein the optical coupler is configured to redirect the first data item and the second data item from the first ODL to the second ODL; and
a first input switch operatively connecting the first receiving node with the second ODL and configured to switch the first data item from the second ODL to the first receiving node during the first timeslot.

2. The system of claim 1, further comprising:
a second input switch operatively connecting a second receiving node with the second ODL and configured to switch the second data item from the second ODL to the second receiving node during the second timeslot, wherein the second input switch is deactivated for the first timeslot, and
wherein the first input switch is deactivated for the second timeslot.

3. The system of claim 2, wherein the first sending node and the second sending node are located within a node row of a node array, and wherein the first receiving node and the second receiving node are located within a node column of the node array.

4. The system of claim 3, wherein the node array is disposed on a single macro-chip.

5. The system of claim 3, wherein the first ODL is a horizontal ODL within the node array, and wherein the second ODL is a vertical ODL within the node array.

6. The system of claim 2, further comprising an arbitration network operatively connected to the first sending node, the second sending node, the first receiving node, and the second receiving node, and configured to allocate the first timeslot to the first sending node and allocate the second timeslot to the second sending node.

7. The system of claim 1, wherein the first input switch is further configured to switch the second data item from the second ODL to the first receiving node during the second timeslot.

8. The system of claim 1, wherein the first ODL comprises a plurality of waveguides.

9. A system for optical data communication, comprising:
a first sending node comprising a first data item for transmission to a first receiving node during a first timeslot;
a first optical coupler operatively connected to the first sending node;
a second sending node comprising a second data item for transmission;
a second optical coupler operatively connected to the second sending node;
a first series of input switches operatively connected to the first receiving node, wherein the first series of input switches comprises a first input switch and a second input switch;
a first plurality of optical data links (ODLs) operatively connecting the first optical coupler and the first input switch, wherein the first plurality of ODLs are configured to propagate the first data item to the first input switch during the first timeslot; and
a second plurality of ODLs operatively connecting the second optical coupler and the second input switch, wherein the second plurality of ODLs are configured to propagate the second data item,
wherein the first input switch is configured to switch the first data item from the first plurality of ODLs to the receiving node during the first timeslot, and
wherein the second input switch is deactivated for the first timeslot.

10. The system of claim 9, wherein the second input switch is configured to switch the second data item from the second plurality of ODLs to the first receiving node during a second timeslot, and wherein the first input switch is deactivated for the second timeslot.

11. The system of claim 9, further comprising:
a second receiving node;
a second series of input switches comprising a third input switch and a fourth input switch operatively connected to the second receiving node,
wherein the third input switch is operatively connected to the first plurality of ODLs and deactivated for the first timeslot, and wherein the fourth input switch is connected to the second plurality of ODLs and configured to switch the second data item to the second receiving node during the first timeslot.

12. The system of claim 9, wherein the first sending node and the second sending node are located within a node row of a node array, and wherein the first receiving node is located within a node column of the node array.

13. The system of claim 12, wherein the node array is disposed on a single macro-chip.

14. The system of claim 9, further comprising an arbitration network operatively connected to the first sending node, the second sending node, and the first receiving node.

15. The system of claim 9, wherein the first plurality of ODLs comprises a plurality of waveguides.

16. The system of claim 9, further comprising a second optical coupler operatively connecting two ODLs of the first plurality of ODLs.

17. A method for optical data communication, comprising:
allocating a first timeslot to a first sending node in an arbitration domain and a second timeslot to a second sending node in the arbitration domain;
placing a first data item from the first sending node onto a first optical data link (ODL) during the first timeslot;
redirecting, using a first optical coupler, the first data item from the first ODL to a second ODL operatively connected to a plurality of input switches;
switching, using a first input switch of the plurality of input switches, the first data item from the second ODL to a first receiving node during the first timeslot; and
deactivating the first input switch for the second timeslot,
wherein the first sending node and the second sending node are located within a node row of a node array,
wherein the first receiving node is located within a node column of the node array,
wherein first ODL is a horizontal ODL within the node array, and
wherein the second ODL is a vertical ODL within the node array.

18. The method of claim 17, further comprising:
switching, using a first output switch of a plurality of output switches operatively connected to the first ODL, a second data item from the second sending node onto the first ODL during the second timeslot;
redirecting, using the first optical coupler, the second data item from the first ODL to the second ODL during the second timeslot; and
switching, using a second input switch of the plurality of input switches, the second data item from the second ODL to a second receiving node during the second timeslot,
wherein the second input switch is deactivated for the first timeslot, and
wherein the first data item is placed on the first ODL by a second output switch of the plurality of output switches.

19. The method of claim 17, further comprising:
placing, using a second optical coupler operatively connected to the second sending node, the second data item onto a third ODL during the second timeslot;
redirecting, using a third optical coupler, the second data item from the third ODL to a fourth ODL during the second timeslot; and
switching, using a second input switch of the plurality of input switches, the second data item from the fourth ODL to a second receiving node during the second timeslot,
wherein the second input switch is deactivated for the first timeslot, and
wherein the first data item is placed on the first ODL by a fourth optical coupler.

* * * * *

UNITED STATES PATENT AND TRADEMARK OFFICE
CERTIFICATE OF CORRECTION

PATENT NO. : 8,406,623 B2  Page 1 of 1
APPLICATION NO. : 12/707554
DATED : March 26, 2013
INVENTOR(S) : Koka et al.

It is certified that error appears in the above-identified patent and that said Letters Patent is hereby corrected as shown below:

On Title page 2, in column 1, item (56), under "Other Publications", line 12, delete "Optival" and insert -- Optical --, therefor.

Signed and Sealed this
Ninth Day of July, 2013

Teresa Stanek Rea
*Acting Director of the United States Patent and Trademark Office*